US012800918B2

(12) United States Patent
Volkov et al.

(10) Patent No.: US 12,800,918 B2
(45) Date of Patent: Nov. 17, 2026

(54) OPTICAL SYSTEM FOR EYE TRACKING

(71) Applicant: TRULIFE OPTICS LIMITED, London Greater London (GB)

(72) Inventors: Andrii Volkov, London Greater London (GB); Ben Sherlinker, London Greater London (GB)

(73) Assignee: TruLife Optics Limited, London (GB)

( * ) Notice: Subject to any disclaimer, the term of this patent is extended or adjusted under 35 U.S.C. 154(b) by 434 days.

(21) Appl. No.: 18/569,651

(22) PCT Filed: Jun. 8, 2022

(86) PCT No.: PCT/EP2022/065568
§ 371 (c)(1),
(2) Date: Dec. 13, 2023

(87) PCT Pub. No.: WO2022/263255
PCT Pub. Date: Dec. 22, 2022

(65) Prior Publication Data

US 2025/0123481 A1 Apr. 17, 2025

(30) Foreign Application Priority Data

Jun. 14, 2021 (GB) ..................................... 2108459

(51) Int. Cl.
*G02B 27/01* (2006.01)
*G02B 27/00* (2006.01)
*G06T 7/73* (2017.01)

(52) U.S. Cl.
CPC ..... *G02B 27/0093* (2013.01); *G02B 27/0172* (2013.01); *G02B 27/0176* (2013.01);
(Continued)

(58) Field of Classification Search
None
See application file for complete search history.

(56) References Cited

U.S. PATENT DOCUMENTS 8,939,579 B2 1/2015 Agurok
10,712,571 B2 7/2020 Popovich et al.
(Continued)

FOREIGN PATENT DOCUMENTS

WO 2016/046514 A1 3/2016
WO 2020/043472 A1 3/2020

OTHER PUBLICATIONS

International Search Report dated Oct. 11, 2022 from corresponding International Application No. PCT/EP2022/065568, 4 pages.
(Continued)

*Primary Examiner* — Derek S. Chapel
(74) *Attorney, Agent, or Firm* — Ruggiero McAllister & McMahon LLC

(57) ABSTRACT

The disclosure relates to an optical system for eye tracking, including: a light source arranged to emit light; a light detector for detecting light and indicating positional information of the detected light thereby; a Holographic Optical Element (HOE) arrangement configured to direct light from the light source towards an eye, to receive at least one glint of the light from the eye and to direct light from the received at least one glint to be in focus at the light detector, the HOE arrangement being configured with a large enough numerical aperture so that ambient or stray light directed by the HOE arrangement is out of focus at the light detector. The optical system may form part of an Augmented Reality (AR) or Virtual Reality (VR) system.

20 Claims, 11 Drawing Sheets

(52) U.S. Cl.
CPC ........ *G06T 7/73* (2017.01); *G02B 2027/0138* (2013.01); *G02B 2027/014* (2013.01); *G02B 2027/0174* (2013.01); *G02B 2027/0178* (2013.01); *G06T 2207/10048* (2013.01); *G06T 2207/30041* (2013.01)

(56) References Cited

U.S. PATENT DOCUMENTS

| | | | | |
|---|---|---|---|---|
| 10,838,362 | B2 | 11/2020 | Kim et al. | |
| 2018/0232048 | A1* | 8/2018 | Popovich | G02B 6/105 |
| 2019/0253700 | A1* | 8/2019 | Tornéus | G06F 3/012 |
| 2020/0089318 | A1 | 3/2020 | Brennan et al. | |
| 2020/0192279 | A1* | 6/2020 | Kim | G03H 1/0402 |
| 2021/0041693 | A1 | 2/2021 | Mamishin | |
| 2022/0413603 | A1* | 12/2022 | Held | G02B 27/0093 |
| 2023/0194882 | A1* | 6/2023 | Yu | G02B 27/0172 359/13 |

OTHER PUBLICATIONS

Written Opinion dated Oct. 11, 2022 from corresponding International Application No. PCT/EP2022/065568, 5 pages.

Holmqvist et al.; "Eye tracking: A comprehensive guide to methods and measures", Oxford University Press, 2010, 22 pages, https://play.google.com/books/reader?id=5rIDPV1EoLUC&pg=GBS.PA1&hl=en.

* cited by examiner

OPTICAL SYSTEM FOR EYE TRACKING

CROSS-REFERENCE TO RELATED APPLICATIONS

This application is a national stage application, filed under 35 U.S.C. § 371, of International Patent Application No. PCT/EP2022/065568, filed on Jun. 8, 2022, which claims priority to United Kingdom Patent Application No. 2108459.5, filed on Jun. 14, 2021, the entire contents of each of which is incorporated by reference herein in its entirety.

BACKGROUND

1. Field of the Disclosure

The disclosure concerns an optical system for eye tracking, such that it may form part of an eye tracking system. The optical system may form part of an Augmented Reality (AR) or Virtual Reality (VR) system.

2. Description of the Related Art

Eye tracking has numerous applications in user interface studies or optimisation, health, psychology, automobile safety, military and accessibility and is also used to understand behaviour of a user in response to stimuli, for example advertising. An emerging field is that of augmented reality (AR) and virtual reality (VR), where eye tracking is expected to be a significant component, allowing for user interface control and helping to provide a high quality virtual image to the user. AR provides a virtual image overlaid on the real world and increasing applications are being developed for this technology.

Eye tracking techniques are typically split into three groups: optical eye tracking; eye-attached tracking; and electric potential measurement. Optical eye tracking is the most commonly used, due to being non-invasive and inexpensive and is the method discussed within this disclosure.

Optical eye tracking systems are of two main types: table-mounted with a remote camera; or head mounted in a glasses or helmet form factor. Eye tracking is understood as measuring the rotation of the eye. In contrast, gaze tracking is typically understood to include determining what the user is looking at in the real world and incorporates additionally tracking the head position. This is typically achieved with an outward facing camera (world camera) or accelerometer on a head mounted device. Calibration is desirably used to correlate the eye rotation with the gaze direction.

Optical eye tracking head-mounted systems typically have an infrared (IR) light source to illuminate the eye and an IR camera (for example, a Charge Coupled Device, CCD) to capture an image of the eye, both mounted near the eye on the head-mounted structure, for instance an eyeglasses frame. Machine vision algorithms can then determine the position of the corneal reflection from the light source, also called a glint or first Purkinje image or spot, and the position of the pupil. The vector between the pupil center and the glint determines the eye rotation and hence the gaze direction. In principle, there are multiple Purkinje reflections that could be used, but in practice the other reflections are typically too weak. However, the computational requirements are high, so most eye trackers run at relatively low frame or refresh rates (30-200 Hz, a latency of 4-33 ms). This low refresh rate limits the application of eye tracking in AR. The eye has two main movement types: fixations; and saccades. Saccades are fast eye rotational movements (up to 900 degrees per second), so tracking saccadic movements demands a significantly higher refresh rate.

The accuracy of optical eye tracking, that is, the angular discrepancy of the calculated gaze point against the true gaze point, is also relevant. This accuracy is typically between 0.5 and 2 degrees.

The power consumption of optical eye tracking systems is especially significant for wireless AR glasses, which are designed to be worn for long periods of time, so are desirably lightweight with long battery life. Computational requirements should be kept to a minimum to facilitate this. Current head-worn eye tracking devices have high power consumption (up to 1 W).

For AR, the machine vision computation is made more difficult by the off-axis view of the eye from the camera, which is typically necessary to provide a compact form factor and meet transparency requirements of AR glasses. For VR, the camera can be off-axis or on-axis (for instance, using a hot mirror beamsplitter). Eye tracking in AR or VR allows for foveated rendering and other computational effects to reduce computation power, increase visual comfort and reduce motion sickness. This depends on low latency eye tracking, however.

AR products are yet to achieve consumer acceptance. One reason for this is the trade-off between brightness, field of view (FOV) and eyebox (defined as the area within which the eye can see the virtual image) inherent in existing AR optical system designs. Current compact AR products are typically in one of two configurations: a waveguide design; or a virtual retinal display (VRD). A waveguide design has a large eyebox created by replicating the virtual image, but this decreases the brightness and has low power efficiency, as well as being expensive to manufacture. A VRD design is less expensive and more compact with a bright image and high power efficiency, but has a small eyebox. Mitigation for the small eyebox can be made by fitting each user with a custom pair of glasses, but this is expensive. With low latency eye tracking, VRD designs could be improved to overcome this eyebox limitation. For example, a single eyebox could be steered via a microelectromechanical system (MEMS) mirror via eye tracking, or multiple separate eyeboxes could be generated and switched on or off depending on where the eye is looking. This demands improvements to existing eye tracking systems in view of the issues raised above.

Holographic optical elements (HOEs) are used in AR as they are largely transparent and can reflect a virtual image from a projector to the eye. Typically, HOEs reflect visible light (400-700 nm), but they can be designed to reflect infrared (IR) light (700-1500 nm). IR and visible transparent holograms can be overlaid on each other to combine functions. IR light is preferred to illuminate the eye as it is invisible to the user (especially wavelengths >820 nm). U.S. Pat. No. 10,838,362 B2 is an example of an optical eye tracking system that uses HOEs to act as mirrors and thereby provide an on-axis view of the eye to an IR camera, which allows for lower computation requirements. However, the computational requirements are still higher than desired. These HOEs use "free space" holograms, so-termed because they act like a transparent concave mirror, reflecting the glint to the camera. Due to the reciprocal nature of such HOEs, the IR light can also be directed onto the eye by the hologram and retro-reflected back to the camera. Commercialisation of HOE based systems has been hampered by the lack of holographic material sensitive to IR light, but now there are new suitable materials available.

In order to reduce the computational requirement, U.S. Pat. No. 8,939,579 B2 suggests measuring only the glint reflection from the cornea. Here, the curve of the cornea acts as a convex mirror, reflecting the illumination IR point source (an LED or laser) as a spot back towards the camera or detector via a lens. A collimated beam is directed to the eye and a transparent waveguide and HOEs are used to redirect the glint reflection (or first Purkinje image) and this spot is focused by a lens onto the camera. In principle, the position of this spot on the camera corresponds to the rotation of the eye and requires less computation than calculating the relative position of the pupil and the glint. However, achieving high accuracy is difficult, especially by focusing the spot to a small size.

U.S. Pat. No. 10,712,571 B2 takes a similar approach, but utilises technology from optical mouse sensors, which can work by detecting relative movement of a laser speckle pattern from a diffuse surface as the object or sensor moves. A collimated beam is directed to the eye and a waveguide and HOEs are used to redirect the speckle pattern via a lens to the camera. This may require significantly less computation (and hence has lower latency) than other approaches. However, it is still challenging to track a speckle pattern from the eye, which has a curved watery surface.

US-2021/0041693 A1 and WO-2020/043472 A1 suggest the use of a HOE to illuminate the eye and incorporate an IR source into an AR projection system based on a VRD, using a laser beam scanner with a MEMS mirror and a hologram to focus an image through the pupil (or center of iris) and onto the retina. Both these documents describe scanning the IR light, which is focused at the pupil and measuring the reflected light via a self-interference effect in the IR laser.

An optical system for eye tracking that is compact and allows low computational requirements, low latency (allowing high refresh rate) and high accuracy for eye tracking is therefore desirable.

SUMMARY

Against this background, there is provided an optical system for eye tracking and an augmented reality (AR) or virtual reality (VR) system. Further optional and/or advantageous features are defined in the dependent claims.

A light source and a light detector (which are preferably, but not necessarily, co-located and/or integrated) can be used for indicating positional information of one or more glint reflections. A Holographic Optical Element (HOE) arrangement (which preferably uses a single HOE, but may use multiple HOEs in some embodiments), receives light from the light source, directs it towards an eye (advantageously, focusing or converging the light on the eye), receives the glint reflection (or reflections) from the eye and to direct these to be in focus at the light detector. The light source is beneficially a point light source and/or emits divergent light. The light is preferably infrared, but may be visible in some cases. The HOE arrangement (or at least the part that redirects the glint to the detector) has large numerical aperture (NA), specifically large enough such that ambient or stray light is out of focus at the detector. For example, the NA may be at least (or greater than) 0.2 or 0.3, preferably around 0.5 and typically no more than 0.8. This may be effected, at least in part, by dimensioning and/or provisioning the HOE (hologram) to be of sufficient size and/or optical power to achieve a large NA.

An eye tracking system can therefore be provided with a free space HOE, which acts as an off-axis transparent mirror with a large numerical aperture to focus the IR light to the eye, particularly to converge to a point behind the surface of the cornea, for example between the corneal and scleral center, more preferably behind the iris (for instance, the center of curvature of the sclera) and most preferably the center of curvature of the cornea (or somewhere between centers of curvature of the sclera and cornea). The same HOE (or another HOE in some circumstances) may then retro-reflect and focus the image of an IR source (the glint) onto a photodetector. The large NA means that only the glint is in focus, whereas any ambient or stray light is out of focus. This allows for very low computational requirements and hence low latency eye tracking. Reducing the ambient or background light may increase a signal to noise ratio of the detected glint, thereby improving tracking. In contrast, many existing systems are concerned with focusing the light to a narrow beam for precision. In a laser MEMS or VRD system (as discussed above), a narrow pseudo-collimated laser beam spot is used and a mirror is moves to scan or raster this spot across the HOE and onto the eye, so there is only a low instantaneous numerical aperture. Increasing the numerical aperture of the HOE has, in contrast, been found to improve tracking, in view of the noise reduction. The design described herein can have accuracy in the order of 0.1 degree and latency on the order of 1 ms or less (1000 fps or more refresh rate), which is a significant improvement on existing designs.

The optical system may be optimised to provide a compact, inexpensive, low latency, high accuracy, low power eye tracking system with a large numerical aperture (NA) to allow for rapid eye tracking, preferably for use with a head worn augmented reality (AR) or virtual reality (VR) device.

Positional information of the eye (for instance, a rotation of the eye) may be determined based on the detected glint, for example at a processor. In particular, the light detector may detect an image (as a camera and/or array). Then, the positional information may be determined based on a location of the detected glint in the detected image. The light detector may comprise one or more of: a position sensitive detector; a photosensor or photodiode array; and an optical flow sensor. Options for the light source may include a vertical-cavity surface-emitting laser (VCSEL), a laser diode and a broadband LED with one or more filters to reduce spectral bandwidth. Preferably, there is no lens between the HOE arrangement and the light detector. This may be advantageous in reducing the overall NA of the system and thereby avoid stray or ambient IR light (particularly sunlight) from affecting performance. Alternatively, an autofocusing lens may be provided between the HOE arrangement and the light detector in some embodiments.

Beneficially, the HOE arrangement may comprise one or more point to point holograms, each recorded to act as an ellipsoidal mirror and/or to focus received light to two finite focal points. Each hologram or HOE may be configured to converge light to a different point and/or at a different angle.

A HOE in the arrangement (or the HOE if only one is used) need not simply redirect the glint, but may use the (or each) glint to replay a hologram, which is then focused onto the light detector. Additionally or alternatively, a HOE may use the light from the light source, typically a spot, to replay multiple holograms at the eye, each hologram converging at a slightly different angle so as to generate multiple glints (and/or different holograms may be converged to different points, for example to the corneal center or scleral center). In another option, multiple distinct (infrared) light sources may be used to generate multiple glints.

The HOE arrangement may comprise multiple HOEs. For example, a first HOE may reflect light from the light source towards the eye. A second HOE may receive the glint reflection (or reflections) and focus that light onto the light detector. Optionally, the multiple HOEs may formed on the same substrate and/or (angularly) multiplexed. In other embodiment, multiple HOEs are used to couple light into and out of a waveguide, for instance with a first HOE (or HOE configuration) incoupling light from the light source and outcoupling glint light to the light detector and a second HOE (or HOE configuration) arranged along the waveguide and spatially separated from the first HOE outcoupling light to the eye and incoupling glint light.

The light source and light detector may be integrated by modulating light emitting diodes (LEDs), so as to be used as sensors when not emitting light, or by integrating separate light sources and light detectors within a single device.

In another implementation, the light source and light detector are spatially separated. For example, a beam splitter may be used to keep the light from the light source and the received glint along the same path between the beamsplitter and HOE, but split the path from the beam splitter to the light source and to the light detector.

The light source, light detector and HOE arrangement may be mounted on a frame structure (for example, an eyeglasses frame, helmet, visor or similar), for a user to wear, particularly on their head. The frame may be configured such that the distance between the HOE and the eye is small to provide a sufficiently large numerical aperture for the optical system such that ambient or stray light is out of focus at the detector and/or such that the HOE converges the IR light behind the cornea and preferably to the center of curvature of the cornea and/or sclera of the eye, as discussed above.

The optical eye tracking system may form part of an AR or VR system, also comprising an optical display system, for displaying AR or VR images. The optical eye tracking system may provide an eye measurement indication, which can then be used to control the optical display system.

Combinations of aspects or features from aspects may also be considered, where such combinations are feasible.

BRIEF DESCRIPTION OF THE DRAWINGS

The disclosure may be put into practice in a number of ways and preferred embodiments will now be described by way of example only and with reference to the accompanying drawings, in which.

DETAILED DESCRIPTION

A free space HOE (or HOE system) can act as an off-axis transparent mirror with a large numerical aperture. The numerical aperture of an optical system can be understood with reference to the depth of field of a traditional camera. If a camera reduces its aperture (an iris is reduced in diameter, a high f number, for instance f/11), then the depth of field is increased, as the rays of light entering the camera are largely parallel, and every object plane is largely in focus at the image plane. Alternatively, if the camera increases its aperture (an iris is increased in diameter, a low f number, for instance f/1.4), then the depth of field is decreased (shallow), as the rays of light entering the camera are largely divergent, and only one object plane is largely in focus at the image plane. Hence, the large numerical aperture system described herein will have a shallow depth of field and any stray and/or ambient light will be defocused. The signal to noise ratio at the photodetector will be significantly increased as a result, thereby reducing the computational requirements and latency of the eye tracking system.

Figure 1:
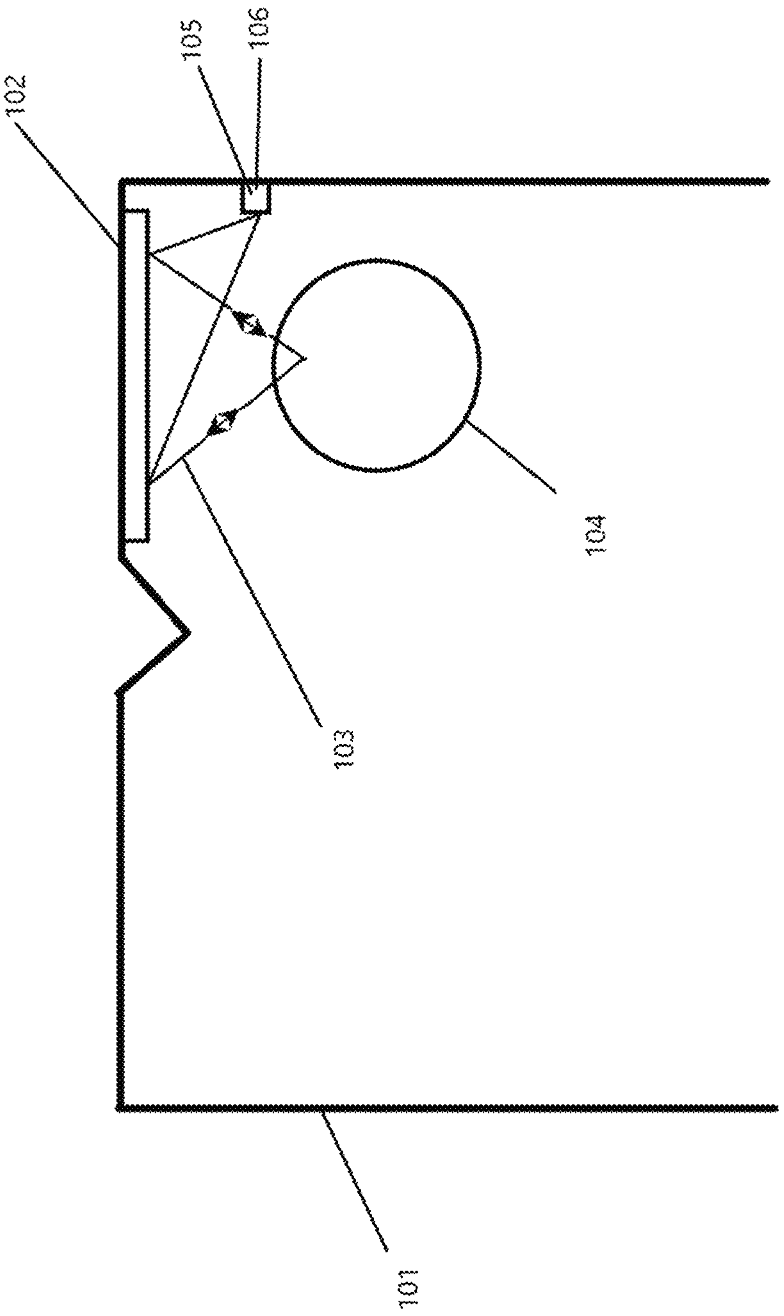
FIG. 1 depicts a top down schematic view of a first embodiment of an optical system according to the disclosure.

Referring first to FIG. 1, there is depicted a top down schematic view of a first embodiment of an optical system according to the disclosure, typically designed for AR applications. This comprises: an eyeglasses frame 101; a HOE 102; an IR light source 105; and an IR camera 106 (for example, a photodetector array, which may be a CCD for instance). The IR light source 105 and the IR camera 106 are co-located and therefore shown as a single block in the diagram. Preferably, the IR light source 105 and the IR sensor or camera 106 form part of a single device and they may be integrated, but it is also possible for them to be two separate devices that are adjacent and ideally, as close to each other as possible. Two bidirectional light rays 103 and the user eye 104 are shown for completeness.

Divergent light from the IR light source 105 is reflected by the HOE 102 to be focused on the eye 104. The HOE 102 advantageously also converges the light to the eye 104, as will discussed further below. The eye 104 provides a glint, the image of which is then reciprocally converged to a focused spot on the IR camera 106 (termed, retro-reflection). For clarity, FIG. 1 shows a monocular version of the embodiment, but a binocular version would provide higher accuracy gaze tracking and can readily be extrapolated from the drawing.

The form factor of the optical system is such that the user wears a 'normal' pair of eyeglasses, shown by frame 101. The HOE 102 is a transparent hologram that is laminated on or encapsulated in the lenses of the eyeglasses (which are not shown, but can be prescription or non-prescription lenses and can be curved or planar). The IR sensor 106 (CCD or photodiode array) is placed at the temple of the frames, pointing at the hologram. The IR sensor 106 is optimally sensitive to 850 nm IR light, preferably with a filter to exclude unwanted light (wavelength less than 840 nm and/or greater than 860 nm). The IR light source 105 (LED or IR laser) is directed at the eye 104 and, as discussed above, is placed as close as possible to the IR sensor 106 (a beam splitter can be used to effectively overlap the sensor and the IR source, an example of which will be discussed below).

The hologram or HOE 102 reflects and focuses the diverging IR light 103 onto the eye (thus it converges the IR light onto the eye), converging or focusing the light 8 mm behind the front of the cornea (particularly, at the center of curvature of cornea). The divergence and power of the IR source is designed to remain eye safe. The form factor for VR headsets could be similar, with the HOE or hologram laminated onto the VR lens in between the screen and the user (the hologram may need to be compensated for the curvature of the VR lens).

The eye 104 of the user when wearing the eyeglasses is very close to the hologram 102, with a typical eye relief (distance from eye to hologram) of 20 to 30 mm. Therefore, with a typical square hologram, having a side of 25 to 50 mm, a large fraction of the IR light reflected from the eye 104 will be incident on the hologram 102, leading to a large numerical aperture optical system. The hologram 102 reflects and focuses the IR light from the eye 104 onto the IR sensor 106. This appears as a small spot on the IR sensor 106, and as the eye 104 rotates, the spot moves across the IR sensor 106, allowing the effective rotation of the eye 104 to be measured.

Effectively, the divergent IR point source 105 has been retro-reflected and refocused back onto itself, so the position of this small point source can be measured on the IR detector 106 to provide a low latency measurement of the rotation of the eye 104. This can be considered as equivalent to a point source (object) at the radius of curvature of a spherical concave mirror, with a diffuser placed next to the point source, such that the retro-reflected spot (image) can be viewed. As the spherical mirror is rotated, the spot will translate laterally across the diffuser. Within a limited rotation range, the spot size will be maintained small enough, such that the position of the spot can be measured and hence, the rotation of the mirror determined.

Figure 2B:
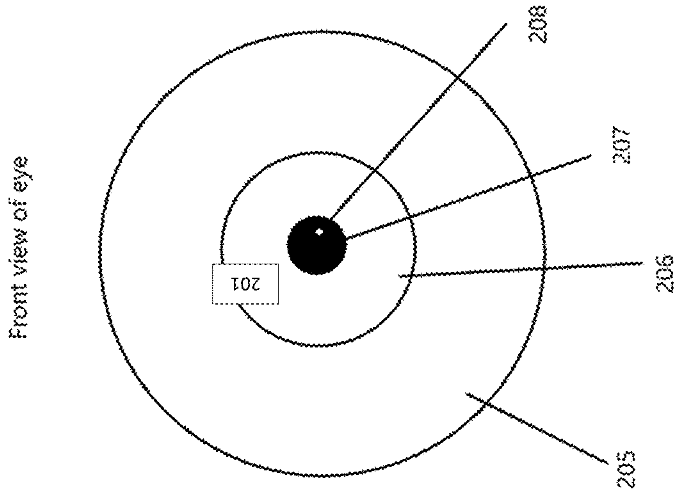
FIG. 2B shows a front view of the eye of FIG. 2A.
Figure 2A:
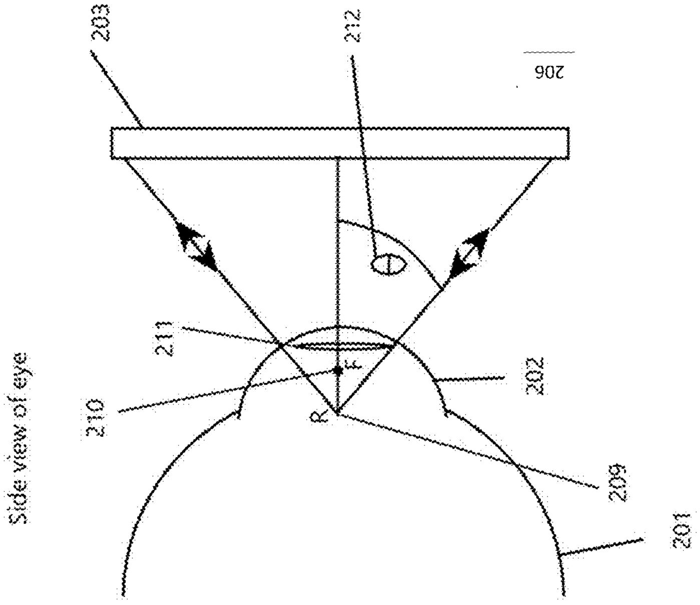
FIG. 2A illustrates a side view of an eye receiving an reflecting light from a Holographic Optical Element (HOE).

Referring to FIG. 2A, there is illustrated a side view of an eye 201 receiving and reflecting light from a HOE 203. Reference is also made to FIG. 2B, in which there is shown a front view of the eye of FIG. 2A. The eye 201 is shown together with the cornea 202, sclera (eyeball) 205, iris 206 and the pupil 207.

The HOE 203 converges the IR light onto the center of curvature R 209 of the cornea 202 and the IR light is retro-reflected back to the HOE 203. The surface of the cornea 202 acts as a convex mirror. The focal point F 210, if the eye was illuminated with collimated light, is shown. Typical eye tracking systems illuminate the eye with diverging IR light, or more rarely collimated or slowly converging IR light. As will be explained below, an issue with this is that the IR light reflected from the sclera 205, the iris 206 and the retina of the eye (the back of the sclera 205) is also in focus along with the desired IR light reflected from the surface of the cornea 202 (glint 208). This reduces the signal to noise ratio and increases computational requirements.

Typically, the center of curvature R 209 is 8 mm behind the surface of the cornea 202, the iris 206 is 2 mm behind the surface of the cornea 202 and F 210 is 4 mm behind the surface of the cornea 202. The proximity of the iris 206 to F 210 indicates that illuminating the eye with converging light, specifically converging to the center of curvature R 209, is optimal for blurring the unwanted image of the iris (especially compared to diverging or collimated illumination).

As noted above, the cornea 202 has a radius of curvature R 209 of about 8 mm. Also, the sclera 205 has a radius of curvature of about 12 mm. The cornea 202 acts as a convex mirror, and can thus be analysed using the mirror equation $1/f=1/o+1/i$ (where f is the focal length, o is the object distance and i is the image distance). If the cornea is illuminated with collimated light (such that the object distance, o, is infinity) the focus (f) is at $f=R/2=4$ mm. As the iris 206 is 2 mm behind the cornea, both the iris 206 and the glint 208 (focal point, 4 mm from the corneal surface) are in focus, reducing the signal to noise ratio.

In contrast, the cornea 202 may be illuminated with a rapidly converging beam, in particular converging to 8 mm behind the surface of the cornea 202 (the center of curvature R 210 of the cornea 202). In this situation, the object and (virtual) image position are effectively the same, at the radius of curvature R 210, 8 mm behind the surface of the cornea 202. This can be compared with a concave mirror with a point source at the radius of curvature, creating a retro-reflecting system. Therefore, the iris 206 (2 mm behind the surface of the cornea 202) is further from the image (8 mm behind the surface of the cornea 202). Light reflected from the iris 206 is largely defocused at the HOE 203, advantageously increasing the signal to noise ratio.

Thus, converging to the center of curvature of the cornea may mean that the wave front of the converging beam perfectly matches the wave front of the reflected beam from the surface of the cornea. In other words, the reflection from the surface is a retro reflection. Beneficially, this may give the lowest possible aberration and consequently smallest possible spot size on the detector or camera. Even if there is some divergence from the center of the cornea (for instance, due to eye movement), benefits may still be possible if the light from the HOE is converged to the center of curvature of the sclera (or indeed, between the two centers of curvature). Convergence to the center of the sclera (eyeball) may not necessarily result in minimum aberration, but aberration may still be significantly reduced compared with other configurations and, as the eye rotates, the aberrations may be lower at the edges of rotation compared to the corneal reflection.

It should be noted that, although the above describes converging IR light behind the cornea 202, light does not actually reach the center of curvature R 210 of the cornea 202. Rather, this focal point represents a virtual image, as the imaged IR light is reflected from the surface of the cornea 202, which acts as a convex mirror. Therefore, the refractive index of the eye is irrelevant to the reflected glint 208.

The front view of the eye in FIG. 2B shows the sclera 205, the iris 206, the pupil 207 and the glint 208 (first Purkinje image). As the eye rotates, the position of the glint 208 will appear to move laterally across the surface of the eye, at a different apparent rate to the pupil center. Typical eye tracking systems calculate the vector between the glint 208 and the center of the pupil to determine gaze. In the design described herein, the light reflected from the eye (sclera 205, iris 206 or retina) is blurred at the image plane and only the glint 208 (spot) is visible.

The HOE 203 can then converge the reflected light to the IR detector (as discussed with reference to FIG. 1), for instance a CCD (not shown in FIG. 2A or 2B). An angle θ

212 is the half angle of the converging rays from the HOE 203 to the center of curvature of the cornea 202, which is the angle used in the object space numerical aperture (NA) calculation.

The NA of a typical existing eye tracking system is in the order of 0.01 to 0.1 (in which NA=n*sin(θ), where θ is the half-angle between the eye and the hologram and n is the refractive index of air, 1). An optical system will have: an object space NA, which is the cone of angles of light captured coming off the object (that is, how big or close the lens or mirror is to the object); and an image space NA, which is the cone of angles captured by the detector (that is, how big or close the lens is to the detector). The HOE NA is the range of angles used in recording the hologram, that is, how divergent or convergent the lens is in recording it.

In theory, the HOE NA and object space NA should be the same, and although they differ in practice, the HOE NA is a key component of the object space NA, together with eye relief. For example, an object space NA of 0.45 may be achieved by the eye relief and the HOE size being the same. An eye relief of 25 mm (which is typical) with an HOE of 25 mm diameter may therefore achieve this object space NA, although form factor can vary with different designs and this would assume that the HOE is recorded such that it can utilise the maximum angles.

The object space NA may define the depth of field: the larger the object space NA, the shallower the depth of field, so the only object in focus will be the desired reflected glint. The image space NA is ideally as large as possible, but any reduction may not be as critical to performance as the object space NA and/or HOE NA.

The typical camera aperture will be on the order of 1 to 3 mm and the distance from the eye to the camera will be on the order of 35 to 50 mm. A VRD type eye tracking system (for instance, as described in US-2021/0041693 A1) with a pseudo-collimated scanning beam typically has a very small NA of around 0.01. The design described herein has a NA on the order of 0.5 (ideally greater than 0.2 or 0.3 and preferably less than 0.8), as the HOE (hologram) captures a large fraction of the IR light angles reflected from the eye. The NA is also kept large when no lens is used between the HOE and the IR detector (which would act as a limiting aperture). Effectively, the hologram size may determine the exit pupil of the system, which is a significant improvement.

As the NA of the system is at least an order of magnitude greater than typical eye tracking systems, the only part of the image that is in clear focus is the glint from the corneal surface, whereas the rest of the image (for instance, reflections from the iris) is blurred. The NA can be an object space or image space NA, but for this application, an object space NA, which is effectively defined by the angle between the eye and the hologram may be the most relevant. Hence, shortening the eye relief and increasing the hologram active area size, may increase the object space NA (assuming the hologram is recorded to match this).

Existing VRD-type systems (for instance, as described in US-2021/0041693 A1) use a converging beam onto the eye which is retro-reflected to a sensor, but the IR light is generated by a narrow beam (laser beam scanning, rather than a diverging point source) and hence has lower numerical aperture. In such systems, the point source is effectively at the laser beam scanning mirror and the sensor is physically separated from the mirror, which also limits the numerical aperture.

Eye tracking systems are desirably careful of eye safety requirements, which state that IR radiation must be below a certain power threshold. As IR (at eye tracking wavelengths) is invisible to the eye, then the blink reflex (which protects the eye from high power light) does not apply. Focusing IR light on the retina could cause photothermal damage and therefore present as a significant danger. Eye tracking systems therefore maintain a balance between eye safety and having enough power to create a suitably bright image (signal to noise ratio). Advantageously, embodiments according to the present disclosure converge the IR light to a point within the sclera that is less sensitive to photothermal damage. Significantly, the system efficiency is increased, as a large portion of the IR light is utilised as a result of to the retroreflective design and the noise is significantly reduced. Consequently, a comparatively low power IR source can be used, such that the risk of photothermal damage is mitigated.

Typical eye tracking systems have a lens in front of the CCD to capture a wider FOV image of the eye. The physical lens aperture limits the numerical aperture and also focuses unwanted ambient IR light onto the CCD, which reduces the signal to noise ratio. This can be a significant issue when using such eye tracking system in the outdoors, as the sun emits a large amount of ambient IR radiation. The lack of a lens in the novel design described herein is thus advantageous.

Figure 3B:
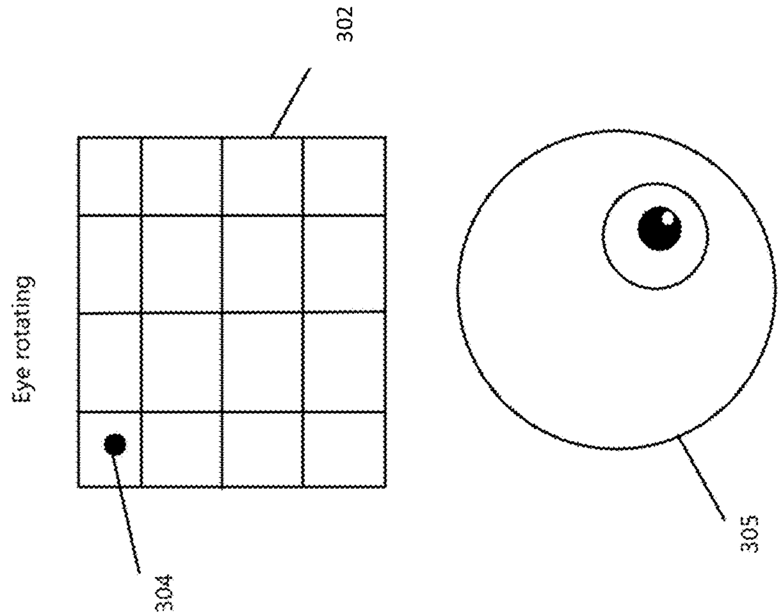
FIG. 3B shows an example imaging position of a glint reflection in the embodiment of FIG. 1 when an eye is a second position.
Figure 3A:
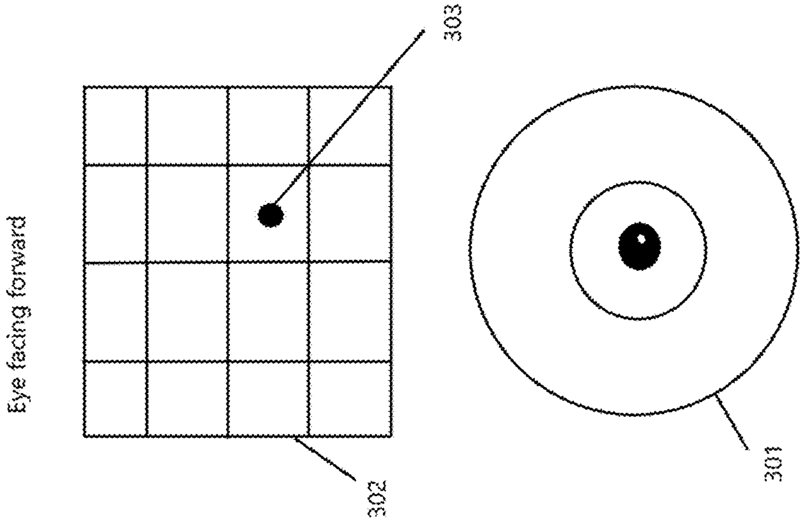
FIG. 3A shows an example imaging position of a glint reflection in the embodiment of FIG. 1 when an eye is a first position.

Referring next to FIGS. 3A and 3B, there are shown example imaging positions of a glint in the embodiment of FIG. 1 when an eye is first and second positions respectively. In both drawings, a portion of a pixelated CCD 302 is shown. The eye in the first position 301 is facing forward and an approximate central position of the glint spot 303 on the pixelated CCD 302 is shown. As the eye rotates, the position of the glint in the image plane translates laterally. The eye in the second position 305 is rotated from the first position and an approximate central position of the glint reflection spot 304 on the pixelated CCD 302 is translated accordingly. As long as the spot size is smaller than the pixel size, the rotation of the eye can be measured accurately (+/−0.1 degree). This readout (in which only the highest pixel value may be indicated) allows for very high frame rates (1000 fps or greater) and equivalently low latency (1 ms or less).

There may be a limit on the eye rotation that the embodiment of FIG. 1 (which may be optimal for a compact pair of AR glasses) can measure, as the magnification is close to 1:1. Once the eye rotates far enough, the spot will move outside of the photodiode active area and will not be detected. Photodiode arrays typically have an active area side size on the order of 1 to 10 mm (and may not be significantly larger while still fitting into eyeglass frames).

A numerical example of the eye rotation (in approximate terms) is that the eye naturally rotates 15 degrees comfortably, up to a maximum of 45 degrees, then the head will rotate instead. Considering the curvature of the eye relative to the virtual glint position and the distance of the hologram from the eye and the CCD, an approximate example is that as the eye rotates 15 degrees, the eye laterally displaces by 3 mm, and the glint laterally displaces by 1 mm at the eye. On the CCD, the spot then displaces by 2 mm. Therefore, for an average CCD width of 4 mm the eye rotation of approximately +/−15 degrees can be tracked before the imaged glint moves off the CCD active area.

The detectable rotation angle of the eye may thus be limited to approximately +/−15 degrees. This may not be an issue for situations where the eye does not need to be detected across its whole rotation angle, for example exit pupil steering for a VRD system with a limited FOV. It may also be possible to use a larger photodiode or multiple photodiode arrays in other eye tracking systems with less constraints on the form factor.

The RMS spot size on the photodiode may be directly linked to the accuracy of the eye tracking system. If the spot size is greater than the pixel pitch of the photodiode then the spot will overlap multiple pixels. Hence, the position may be less well known and the accuracy of the eye rotation measurement reduced. The RMS spot size is a function of the point source size (size of laser or LED; the LED can be masked with a pinhole) and the 'resolution' of the hologram (for example the point source size used in recording the hologram). The spot size may also be increased as the eye rotates and the glint moves away from the optimal focal point of the HOE (acting as an ellipsoidal mirror). The spot size may also be increased as the distance from the IR source to the photodiode increases, as again the spot will not be at the optimal focal point. This implies that although a larger photodiode can measure a larger eye rotation angle, the spot size may increase towards the edges of the photodiode, so the accuracy may be reduced. If the photodiode is tilted towards the center of the HOE (ellipsoidal mirror), that is, the photodiode surface is normal to the chief ray, the spot size may be reduced due to minimising image plane tilt. However, this may not be possible due to a need to reduce volume in a glasses form factor.

The spot size may also increase with the spectral bandwidth of the IR source, the dimensions of the point source and the off-axis angle of the hologram due to the holographic blur function. A narrow bandwidth small diameter laser source (VCSEL or laser diode) might be considered preferable to a broadband LED for this reason. While laser diodes degrade image resolution due to speckle artefacts in normal camera based imaging systems, speckle does not matter according to embodiments of the present disclosure. Alternatively, a broadband LED source can have its spectral bandwidth reduced with filters, and assuming a bandwidth of 10 nm (FWHM) this will produce an acceptable spot size. The off-axis angle should be minimised while retaining a compact form factor. A suitably configured LED may then be preferable to a laser VCSEL, as LEDs have a large spherical divergence compared to a lower (often elliptical) divergence of laser diodes or VCSELs. This may permit more even illumination of the whole eye from the distance of the IR source.

The spot size may be increased if the distance of the light detector to the eye is altered from the nominal design distance (for example, due to the position of the glasses on the heads of different users). This error can be reduced by allowing for adjustment of either the eye relief or the CCD position within the glasses frame. A lens over the CCD could also reduce this error, but would be undesirable as it would reduce the numerical aperture and hence reduce the desired depth of field effect. However, as long as the lens diameter was sufficiently large so as not to restrict the NA (in image space), a lens could be used. Preferably, an autofocusing lens (for instance, a liquid lens or moveable lens stack) could be used, which would then reduce the spot size if there were any variations in the nominal design distance.

There are typically three main application areas for eye tracking. A first area is academic research, where the users have chin rests and everything is locked in place. For this case, positional accuracy is high, so a lens in the detector can be avoided and low latency would be of significant benefit. A second area is advertising or user interface analysis. A sturdy and/or rigid pair of glasses (or other frame) can be used to limit positional tolerance. One or more of an autofocusing lens, calibration, glasses adjustment, and a large detector area can also be used in this case. For AR or VR consumer applications, one or more of an autofocusing lens, calibration, glasses adjustment, and a large detector area are likely to be required.

Configurations according to this disclosure have low computational overhead (and hence low power use and long battery life) due to the lack of machine vision. Moreover, another advantage is achievable in terms of low power use compared to traditional eye trackers. The light usage efficiency is extremely high, as a large percentage of the emitted IR light is captured by the hologram and focused back onto the photodiode. Therefore, the power emission needed to achieve a suitable signal to noise ratio is reduced. New IR sensitive materials can also achieve very high diffraction efficiencies, (at least 80%), which may help to keep a high system efficiency.

Eye tracking systems are desirable calibrated to match the eye rotation of the user to the real world. This may be optimally achieved with a binocular eye tracking system and an outward facing visible light camera. The user focuses on known real world objects (or virtual objects with AR glasses), preferably at different gaze directions and gaze focal planes, to calibrate the system and allow for high accuracy gaze tracking.

In a general sense, there may be considered an optical system for eye tracking, comprising: a light source, arranged to emit light; a light detector for detecting light and indicating positional information of the detected light thereby; and a HOE arrangement, configured to direct light from the light source towards an eye, to receive at least one glint of the light from the eye and to direct light from the received at least one glint to be in focus at the light detector. The HOE arrangement is configured (for example, dimensioned) with a large enough numerical aperture such that ambient or stray light directed by the HOE arrangement is out of focus at the light detector. The numerical aperture may be at least (or preferably, greater than) 0.1, 0.2, 0.3, 0.4, 0.5 or 0.6, but is preferably less than 0.7 or 0.8. The light source is preferably a point light source and/or arranged to emit divergent light. The light is preferably infrared. Advantageously, the HOE arrangement is further configured to converge (or focus) the light from the light source onto the eye and preferably to a position that is at the center of curvature of a sclera or cornea of the eye.

There may also be considered a method of eye tracking having steps corresponding with the operational features of any system disclosed herein. For example, the method may comprise: directing (divergent and/or infrared) light to a HOE arrangement; directing the light at the HOE towards an eye (replaying a hologram); receiving at least one glint of the light from the eye at the HOE arrangement; directing light from the received at least one glint to be in focus at a light detector; and detecting light at the light detector to indicate positional information of the detected light thereby.

In another aspect, an AR or VR system may be provided, comprising: an optical display system, for displaying AR or VR images; an optical eye tracking system as herein described and configured to provide an eye measurement indication; and a processor, configured to control the optical display system based on the eye measurement indication provided by the optical eye tracking system.

Further optional, preferably and/or otherwise advantageous features applicable to any aspect may also be considered, as discussed below.

For instance, the light detector may be further configured to generate an electrical signal based on the detected at least one glint. Then, a processor may be configured to determine positional information of the eye using the electrical signal and the positional information of the detected glint indicated thereby. The light detector may detect an image (specifically, two-dimensional). Then, the processor may determine positional information of the eye based on an identified location of the detected at least one glint in the image.

A frame structure (for instance, an eyeglasses frame, a helmet or a visor) may be provided and configured for a user to wear (for example, head-mounted). The light source, light detector and/or HOE arrangement may be mounted on the frame structure. The frame structure may position the eye in order to achieve any one or more positional relationships between the eye and other features of the optical system as herein disclosed.

Advantageously the light source and the light detector are co-located.

The HOE arrangement advantageously comprises at least one point to point hologram, recorded to act as an ellipsoidal mirror and/or to focus received light to two finite focal points. In embodiments, the HOE arrangement comprises a single HOE.

The light detector may comprise one or more of: a position sensitive detector; a photosensor (or photodiode) array; and an optical flow sensor. Optionally, the light detector may comprise an array, for example having a dimension (or both of two dimensions) of at least about 5 mm, about 7 mm, about 8 mm, about 9 mm or 10 mm and optionally no more than 10 mm. Ideally, the detector is as big as possible. Realistically, CCD devices and position detectors are typically 10 mm or less, and this would be a reasonable size for a pair of eyeglasses, but bigger sizes could be possible.

The light source may comprises one or more of: a vertical-cavity surface-emitting laser (VCSEL); a laser diode; and a broadband LED with one or more filters to reduce a spectral bandwidth of emitted light.

In some embodiments, there is no lens between the HOE arrangement and the light detector. Alternatively, a large NA and/or autofocusing lens may be provided between the HOE arrangement and the light detector.

Further details of specific embodiments will now be discussed. Reference to the general sense detailed above will then be returned to below.

Figure 4:
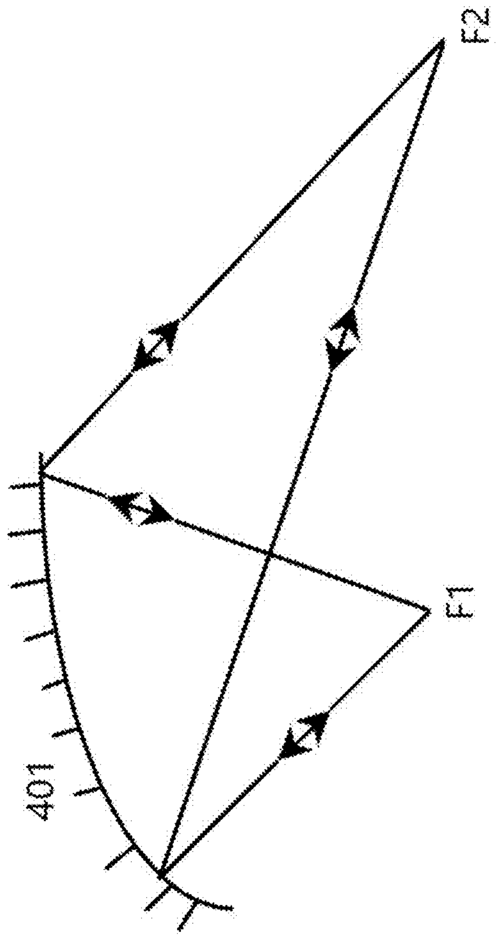
FIG. 4 schematically depicts an ellipsoidal mirror.

The hologram of the HOE is designed as a point to point hologram and recorded in such a way that it acts as an ellipsoidal mirror. This is similar to an off axis ellipsoidal mirror marketed by Edmund Optics Ltd., using the stock number 12497. Referring to FIG. 4, there is schematically depicted an ellipsoidal mirror 401. This kind of mirror is a finite-finite conjugate mirror, with two focal points F1 and F2. This is different to a spherical mirror (one focal point) or a parabolic mirror (two focal points, but one is at infinity).

The IR sensor is optimally a position sensitive detector (PSD), for instance, a device sold under the part number PDQ80A, manufactured by Thorlabs, Inc. This device has only two output wires allowing for very fast (low latency) readout. Alternatively, a low cost silicon (square or rectangular) photodiode array could be used (for instance, CCD or CMOS sensor) ranging in size from 10×10 pixels to 100×100 pixels, with a pixel pitch in the order of 3 to 50 microns, with an overall side dimension on the order of 1 to 10 mm. This kind of low pixel count photodiode will allow for per pixel readout, which allows for very low latency readout. As noted above, rotation of the eye moves the retro-reflected IR spot across the photodiode array. The IR spot will generate a higher photocurrent on the individual pixel it is hitting, so the xy position of the relevant photodiode may be determined, directly corresponding to the eye rotation. A low cost optical mouse sensor (an optical flow sensor, which can track at up to 6400 fps) may also be used, as this has inbuilt algorithms to detect movement. Existing eye tracking systems typically use a large CCD, having many thousands or millions of pixels, which are much slower to readout than a smaller photodiode array. The CCD information also then has to be interpreted via machine vision to provide the eye rotation, which adds to the latency. The existing systems described above have a small numerical aperture (shallow depth of field), for example because of the use of waveguides and pseudo-collimated IR light, which limits the available angles of IR light that can be captured. Therefore (and as described above), some ambient and stray or unwanted light is also focused on the sensor, decreasing the signal to noise ratio and increasing the computation time.

An ellipsoidal mirror is optimised for high numerical aperture and low aberration. The eye tracking design can be implemented using this (or a similar) mirror. The center of curvature of the cornea of the user is at position F1 and the CCD (or equivalent IR detector) is at position F2. The retro-reflecting nature of the two foci is demonstrated. The ellipsoidal mirror shown in FIG. 4 is not transparent, so its application is limited. A hologram designed to act as an ellipsoidal mirror while being transparent can be used in the present disclosure, for a wider range of purposes.

This design appears to give the best performance in terms of numerical aperture and spot size (typically measured as root mean square, RMS, spot size in microns). The smaller the spot size, the lower the latency and the higher the accuracy of the eye tracking system. It should also be noted that the same hologram reflects towards the eye and also back to the camera. By their nature, holograms are reciprocal, that is, a beam from either direction will interact with the hologram.

Increased accuracy may be attainable by reducing the separation between the photodiode and the point source. For example, modulated IR LEDs may be used. The IR LED is turned on (forward biased), then quickly turned off, and a reverse voltage bias is applied to the LED (for instance, as discussed in US-2020/0089318 A1). The LED acts as a photodetector (rather than photoemitter) when reverse biased and a small electrical current is generated when the retro-reflected IR light is incident back onto the LED. If an array of IR LEDs are used and modulated sequentially, the eye rotation angle can be determined based upon which IR LED measures some photocurrent. However, LEDs are not typically optimised for this, so the results may be worse than other techniques. Photodiodes having IR sensors (cameras) embedded behind the partially transparent photodiode array (or CCD) are also known. These could be used, but are currently not widely commercially available.

Figure 5:
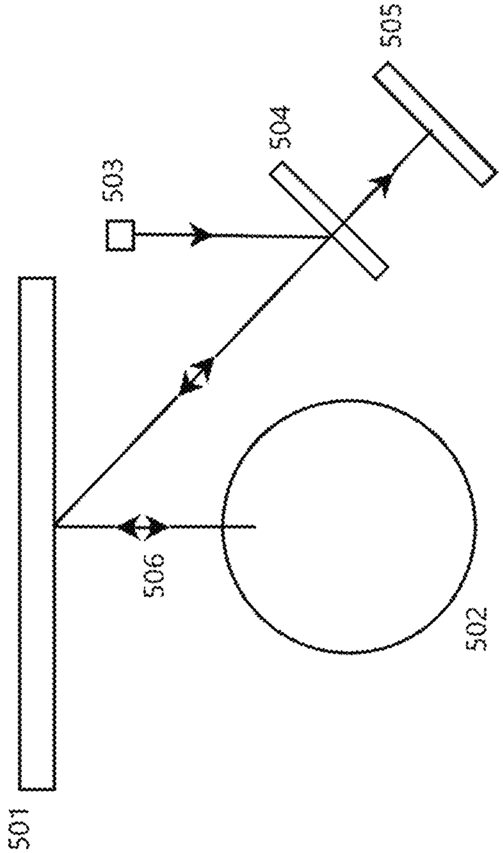
FIG. 5 shows a schematic diagram of a second embodiment of an optical system according to the disclosure, using a beamsplitter.

Whilst the IR light source and IR detector are preferably integrated or at least as close together as possible, this is not strictly necessary. Referring to FIG. 5, there is shown a schematic diagram of a second embodiment of an optical system according to the disclosure, using a beamsplitter. Only part of the design is shown, as the remaining details can be understood with reference to the other embodiments and information disclosed herein. The design comprises: a HOE 501; a light source 504; a beamsplitter 504 (for instance, a 50:50 IR beamsplitter); and a light detector 505 (for instance, CCD).

The chief ray 506 of an illumination path is shown from the light source 503 via the beamsplitter 504 and the HOE 501 to the eye 502 and then retro-reflected back to the light detector 505 via beam splitter. The distance from the light source 503 to the beamsplitter 504 is ideally the same as the distance from the light detector 505 to the beamsplitter 504. The beamsplitter 504 allows for the minimum spot size on the light detector 505. Although this design has a larger form factor than the embodiment of FIG. 1, its configuration will allow for a smaller spot size than the alternative of placing the light source as close as possible to the light detector.

Figure 6:
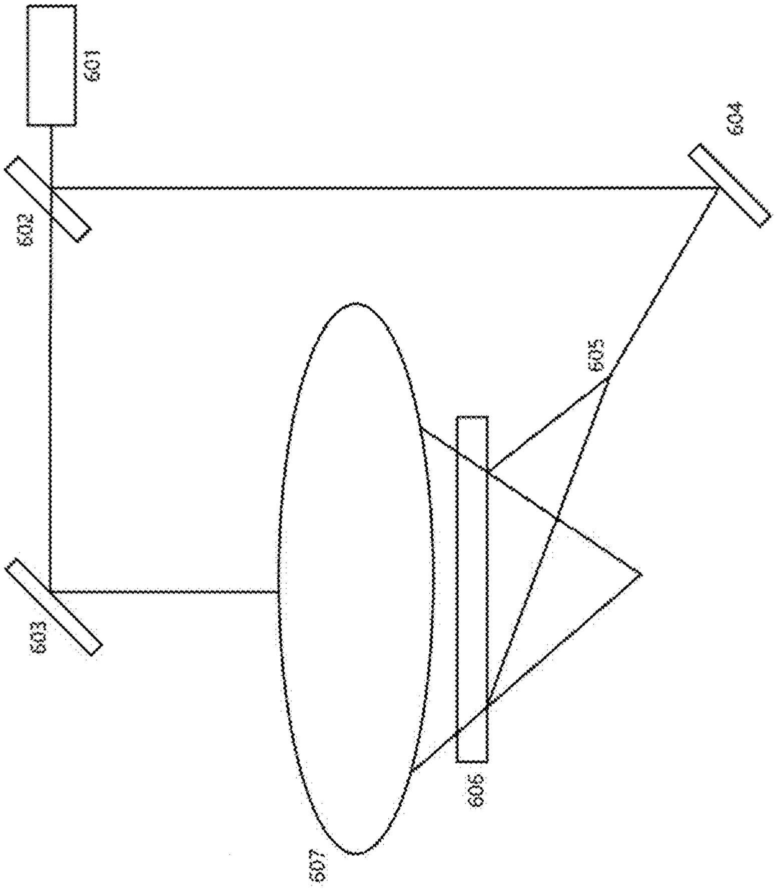
FIG. 6 schematically illustrates a system for recording a hologram in accordance with an embodiment of the disclosure.

Reference is now made to FIG. 6, which schematically illustrates a system for recording a hologram, in particular a HOE for use in an optical system in line with the disclosure. To achieve the high numerical aperture of the HOE in replay, high numerical aperture (that is, rapidly converging and/or diverging) recording optics are used. The system comprises: a coherent laser 601; a beamsplitter 602; a first mirror 603; a second mirror 604; a spatial filter 605; a IR-sensitive material 606; and a high NA lens 607. Only chief rays of light are shown in this schematic diagram for clarity.

The 850 nm coherent light from laser 601 is split by beamsplitter 602 into two paths. A first path of the split light (object beam) is reflected by the first mirror 603 onto the large lens 607. The lens 607 has a high NA and focuses the beam to a small point at the position where the HOE would focus received light in replay (where the eye would be positioned, for instance by the frame in the embodiment of FIG. 1). Thus, the object beam is converging.

A second path of the split light (reference beam) is directed via the second mirror 604 to a spatial filter (a small pinhole), which thereby generates a diverging beam. The spatial filter is effectively located in the position where the light detector would be present during eye tracking using the generated HOE (the pinhole is effectively where the CCD would be). The reference beam is therefore diverging. The NA of the two recording beams should be as large as possible to achieve the maximum NA in replay. In particular, it should be stressed that the lens 607 is evenly illuminated in practice (optimally with a large collimated beam) from the mirror 603, but as noted above, only the chief ray is drawn for clarity. The resultant hologram is recorded as a point to point reflection hologram with the desired replay angles and will replicate an off axis ellipsoidal mirror (as discussed above with reference to FIG. 4), but may also be transparent.

The hologram is preferentially recorded at the desired IR replay wavelength which is invisible to the eye (for example, 850 nm as discussed above), where photosensitive material, coherent recording sources, IR replay sources and cameras are available. It has more recently been possible to obtain IR material sensitive to 850 nm, which is the optimal wavelength considering the factors above. It is possible to record with holographic material that is only sensitive to visible wavelengths and alter the recording angles to achieve the desired replay IR wavelength and angles. However, this may introduce aberrations and hence increase the final spot size. If collimated beams are used recording (rather than converging and diverging beams as shown in FIG. 6), this aberration could be minimised, but it may then prevent the large numerical aperture system being achieved.

Although a specific embodiment has now been described, the skilled person will appreciate that various modifications and alternations are possible. For example, although infrared light is preferably used, other wavelengths (such as visible light) may be employed. One such option may be to use some of projected light from an AR projector (projecting an image for the user to see) to create the glint. Divergent light is preferred, but collimated or convergent light can be used in some embodiments.

It is of course to be understood that variations on the design distances, dimensions, curvatures, angles and component sizes are possible without changing the underlying disclosure. Also, further optical components can be incorporated to redirect and/or process the light as desired. For instance, filters are optionally used with eye tracking systems to block the visible light and reduce noise. Additional approaches according to the disclosure will now be discussed, recognising that combinations of these approaches and/or combination with configuration discussed above may further be considered.

Figure 7:
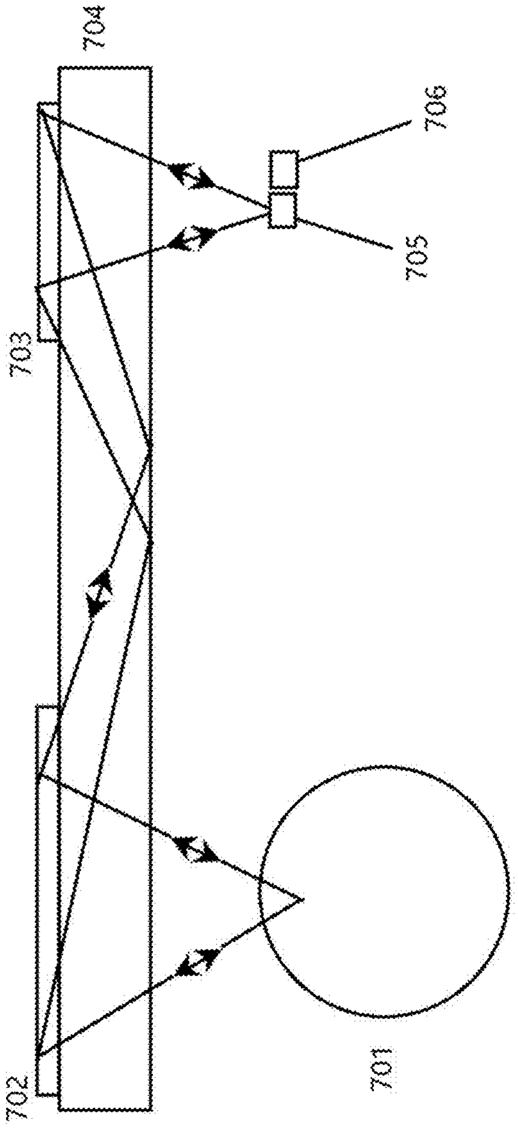
FIG. 7 shows a schematic diagram of a third embodiment of an optical system according to the disclosure, using a waveguide.

One such possible variation involves incorporation of a waveguide. Referring next to FIG. 7, there is accordingly shown a schematic diagram of a third embodiment of an optical system. This comprises: a waveguide 704; an incoupling HOE 703; an outcoupling HOE 702; a IR light source 706 and a IR light detector 705 (for example, a CCD). The light source 706 and the light detector 705 are shown as separate blocks, but are co-located and/or integrated.

Divergent IR light from the light source 706 is incoupled to the waveguide by the incoupling HOE 703, propagates along the waveguide (due to total internal reflection) and is outcoupled from the waveguide and directed to (and preferably converged to the center of curvature of the cornea or sclera of) the eye 701 by the outcoupling HOE 702. The glint from the eye 701 is incoupled to the waveguide by the outcoupling HOE 702, propagates along the waveguide and is outcoupled from the waveguide and directed to (and focused to a spot on) the light detector 705 by the incoupling HOE 703.

This configuration can reduce form factor, but may not be desirable due to limited numerical aperture (as the waveguide may limit the illumination angles) and possible aberrations. Existing approaches using a waveguide are described in U.S. Pat. No. 8,939,579 B2 and U.S. Pat. No. 10,712,571 B2 for example, using a complex set of lenses to focus the spot onto the sensor in an attempt to limit the aberrations, which could be adopted in the design of FIG. 7. However, this also limits the numerical aperture and is therefore not preferred. A further variation in which the light source 706 and the light detector 705 are spatially separated with a beamsplitter to redirect light from along a common axis (as described with reference to FIG. 5) can also be considered.

Further alternative approaches (which may be combined with other approaches described herein) may use a multiplexed HOE design. One such approach may allow a wider range of eye rotation angles to be tracked in a compact way, by recording multiple holograms into the HOE holographic mirror. Each of these holograms may act on the same single IR light source, but converges the light at a slightly different angle to generate multiple spots (glints) on the eye (angular multiplexing). Then each spot will be retro-reflected and focused onto the photodiode, resulting in multiple spots. Effectively, each of the multiplexed HOEs would be a point to point hologram recorded to act as an ellipsoidal mirror with one focal point the same for all HOEs (the detector point) and the other focal point would be slightly different for each HOE (the eye point). As the eye rotates, some spots will move off the photodiode active area but some will move onto the active area. Hence, there will always be at least one spot on the photodiode, increasing the measurable rotation angle of the eye.

Figure 8B:
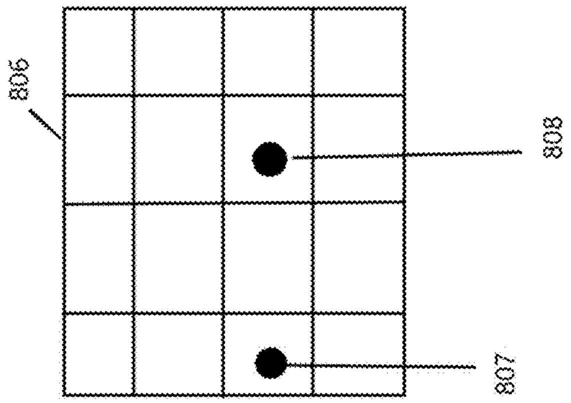
FIG. 8B shows example imaging positions of two glint reflections in the system in accordance with FIG. 8A.
Figure 8A:
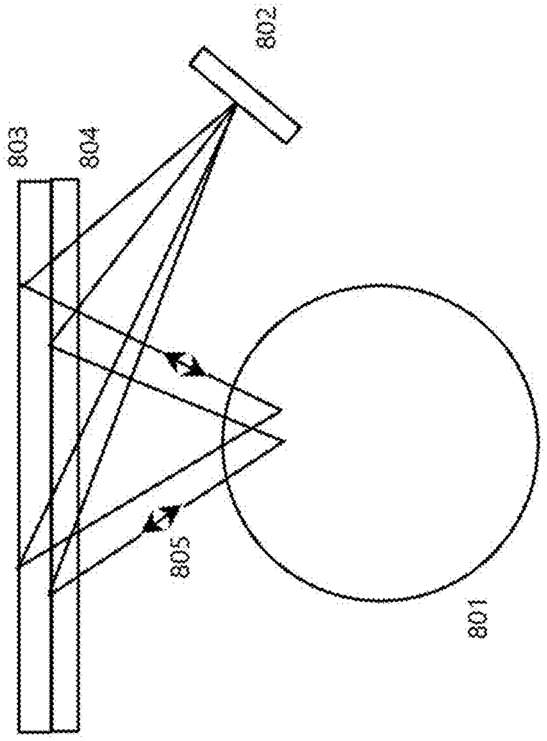
FIG. 8A schematically depicts a variation on part an optical system according to the disclosure, using multiplexed HOEs for generating more than one glint reflection.

Referring now to FIG. 8A, there is schematically depicted a variation on part an optical system, using angularly multiplexed HOEs for generating more than one glint according to this approach. There is shown: a light detector array (for instance, CCD) 802; a first HOE 803; and a second HOE 804. Example light rays 805 are depicted for illustration purposes. A light source is not shown, but its positioning can be inferred from the designs of FIGS. 1 and 5, for example.

The first HOE 803 converges received light to the center of curvature of the eye 801. The second HOE 804 also converges the light to the center of curvature of the eye 801, but at a slightly different angle, to a slightly different position on the eye 801. The first 803 and second 805 HOEs (or more) can be recorded into the same hologram layer by adjusting the angle of a lens through which the object beam is focused (for example lens 607 in the configuration of FIG. 6) with sequential recordings. Alternatively, the multiple HOEs can be recorded separately and be laminated on top of each other.

Referring to FIG. 8B, there is shown example imaging positions of two glints in a pixelated light detector array (CCD) 806, which may correspond with the light detector 802 of FIG. 8A. A first spot 807 and a second spot 808 are generated on the image plane of the detector array 806 from a single point source (not shown). This design could provide two identical (but spatially separated) spots on the CCD, which move relative to each other in a reasonably (but not completely) linear manner as the eye rotates. It would also be possible to fabricate one (or more) of the HOEs such that a diffuse image was generated and focused onto the light detector array 806, for instance a triangle, a star shape or square shape (rather than a circular spot) could be generated. This might allow easier differentiation between 'spots'.

Such designs would allow for greater eye rotation to be tracked, as there would always be at least one 'spot' on the CCD at any time (as the eye rotated and one spot moved off the detector array active area, another spot created by a different hologram would move onto the detector array active area, allowing tracking over a larger rotation angle. It may require more computation power to keep track of which spot corresponds to which glint, so there may be a trade-off between latency and maximum measurable eye rotation angle. U.S. Pat. No. 10,838,362 B2 describes generating multiple glints on the eye using multiplexed holograms, but a camera is used to view the multiple spots on the eye to enhance eye tracking accuracy (rather than measuring retro-reflected glints directly on a CCD). Nevertheless, aspects of this could be incorporated into embodiments according to the present disclosure.

It may also be possible to place multiple IR sources around the photodiode (which could be turned on and off rapidly (modulated) and used with a single (or multiplexed) hologram which will generate multiple spots on the photodiode at different positions. This may again allow for a greater measurable eye rotation. It would further be possible to use multiple wavelengths of IR light with a single hologram to generate multiple spatially separated spots. This would be less practical, however, due to the multiple sources required.

Another advantage of such approaches may be to allow different light to converge to different points on the eye, for example some light (from one hologram) converging to the center of curvature of the cornea and some light (from another hologram) converging to the center of curvature of the sclera (other points may be chosen instead or in addition). This may be achieved using multiple holograms, each with respective different converging powers. This may allow tracking of the cornea and eyeball, which may help mitigate problems due to slippage of glasses relative to the eye.

Figure 9:
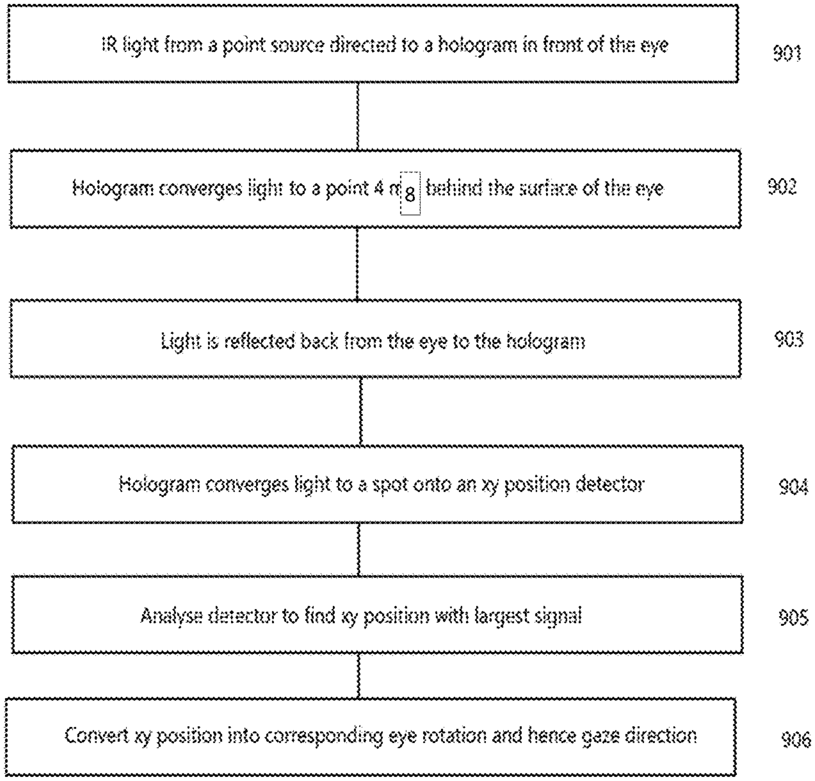
FIG. 9 depicts a flow chart of a procedure in line with the disclosure.

Referring to FIG. 9, there is depicted a flow chart of a procedure in line with the disclosure. This approach may be applied to any embodiment or configuration disclosed herein. In a first step 901, IR light from a point or divergent source is directed to a hologram (HOE or HOE arrangement) in front of the eye of the user. The hologram then directs the light to the eye in a second step 902 and preferably converges the light to a point behind the surface of the eye, for example 8 mm behind the surface of the eye and most preferably at the center of curvature of the cornea and/or sclera. The light is reflected back from the eye (retro-reflected) to the HOE arrangement in third step 903.

In fourth step 904, the HOE arrangement directs, preferably converging, the retro-reflected light to the light detector, which is preferably a two-dimensional (xy) array position detector. The output of the light detector is analysed to determine the two-dimensional position with the largest signal (peak), in fifth step 905. Finally, the determined two-dimensional position is converted into an associated eye rotation in sixth step 906. A gaze direction can thereby be established.

Figure 10:
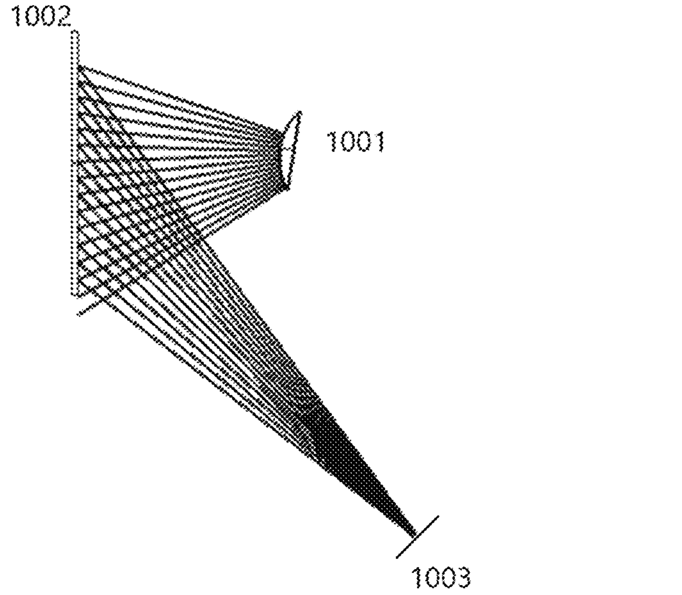
FIG. 10 illustrates ray paths from an optical ray tracing model of a design in accordance with the disclosure.

Reference is now made to FIG. 10, which illustrates ray paths from an optical ray tracing model of a nominal design in accordance with the disclosure, produced by software from Zemax, LLC. This shows paths from an eye 1001 via a HOE 1002 to a light detector (CCD) 1003. In this model, an eye relief of 24 mm is used, a hologram active area of 25 mm diameter is provided, a distance from hologram to detector is 60 mm and a detector size is 5 mm square. The object space NA is calculated as 0.447, which is an advantageously high value that cannot be achieved by other common or known designs.

As the eye rotates, the spot size RMS is approximately 0 when the eye is on axis (user is looking straight ahead), 6 microns when the eye rotates 0.1 degrees, and larger values as the eye rotates further. As long as the spot size remains below a pixel pitch on the CCD (ideally less than 50 microns), the accuracy is as high as possible and latency is as low as possible. If the spot size increases beyond the pixel pitch, the accuracy will decrease and the calculation of gaze direction (and hence latency) will increase. Even in this situation, the system latency is lower than existing systems. The spot size may be reduced by inserting an autofocusing lens in front of the CCD, as long as the diameter of the lens is large enough to not limit the image space NA (0.14 in this configuration).

Figure 11:
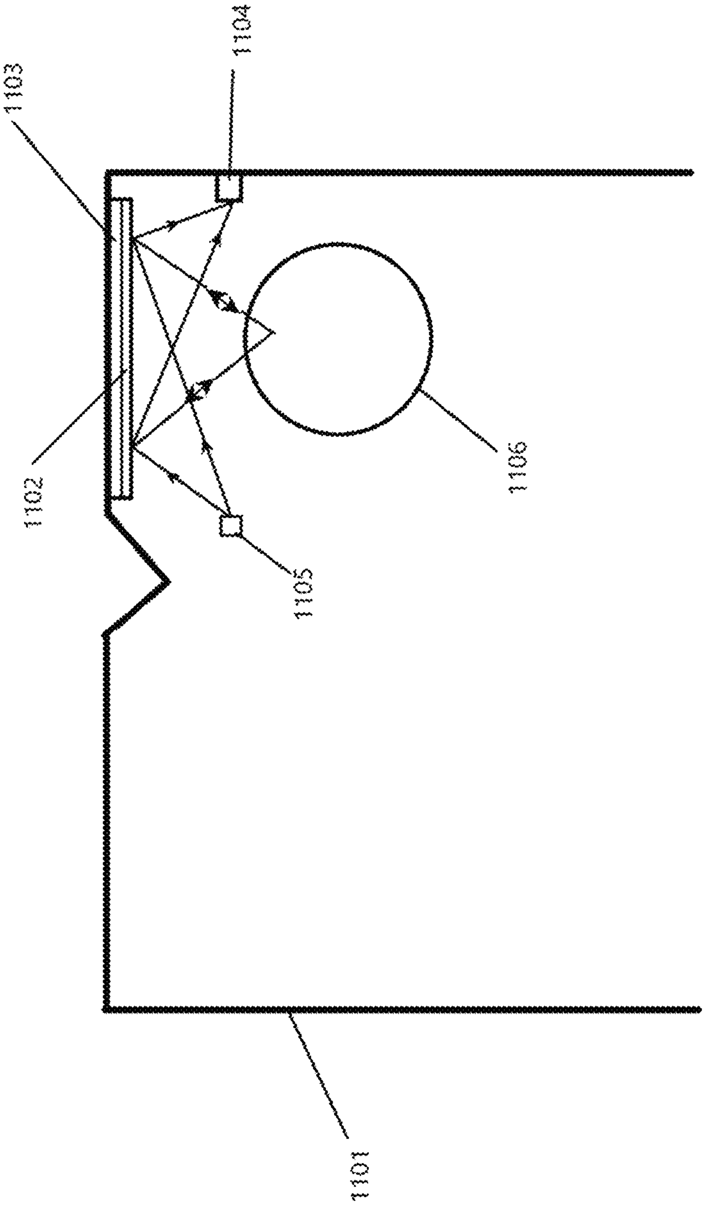
FIG. 11 depicts a top down schematic view of a fourth embodiment of an optical system according to the disclosure, using a spatially separated light source and light detector.

Embodiments in accordance with FIG. 5 above consider a spatially separated light source and light detector, although the distance between the light source and light detector is not necessarily great. Referring to FIG. 11, there is depicted a top down schematic view of a fourth embodiment of an optical system, using a significantly spatially separated light source and light detector. This design comprises: an eyeglass frame 1101; a first HOE 1102; a second HOE 1103; a light detector 1104; and a light source 1105.

The IR source 1105 and IR detector (CCD) 1104 are in different locations, specifically on either side of the longitudinal axis of the first 1102 and second 1103 HOEs. The first 1102 and second 1103 HOEs are multiplexed to replay multiple holograms, for example as discussed with reference to FIGS. 8A and 8B. However, unlike the embodiment of FIGS. 8A and 8B, the holograms are not all directed to the detector.

The propagation direction of the IR light is shown in the drawing. The eyeglasses frame 1101 positions the eye 1106 of the user so that light from the IR source 1105 directed to the first HOE 1102 replays holograms that converge the IR light to the center of curvature of the cornea of the eye 1106. The retro-reflected light then replays holograms recorded on HOE 1103 and converges them in a different direction, to light detector 1104. As long as the system is suitably designed with correct focal points, this system will allow for a smaller spot size (similar to that shown in FIG. 5 with a beamsplitter) than having the IR detector and IR source next to each other.

Returning to the general sense discussed above, further details may be considered. Optionally, the light source and the light detector are integrated. For example, the integrated light source and light detector may comprises one of: a plurality of light emitting diodes (LEDs) modulated, so as to be used as sensors when not emitting light; and separate light sources and light detectors within a single device.

In some embodiments, the HOE arrangement is configured to use each of the received at least one glint to replay a respective hologram, each replayed hologram being focused onto the light detector.

The system may be configured to receive multiple glints from the eye. For instance, the HOE arrangement may be recorded with a plurality of holograms and is configured to use the light from the light source to replay the plurality of holograms. In particular, this may be performed such that each of the plurality of holograms converges at a slightly different angle so as to generate multiple glints from the eye. In some embodiments, the light source comprises multiple distinct light sources, such that the HOE arrangement is configured to direct light from the multiple distinct light sources towards the eye, thereby generating multiple glints from the eye.

The HOE arrangement may comprise a plurality of HOEs, each HOE of the plurality of HOEs being recorded with a different hologram. For example, the HOE arrangement may comprise a first HOE configured to reflect light from the light source towards the eye and a second HOE configured to receive the at least one glint of the light from the eye and preferably, to focus the light from the received at least one glint onto the light detector. The plurality of HOEs may be formed on the same substrate and/or multiplexed.

In some embodiments, a waveguide is provided. Then, the HOE arrangement may comprise: a first HOE configured to couple the light from the light source into the waveguide; and a second HOE configured to couple the incoupled light from the light source out of the waveguide, to reflect the outcoupled light to the eye and to couple the at least one glint of the light from the eye in to the waveguide. The first HOE may be further configured to outcouple at least one glint of the light from the waveguide and to focus the light from the received at least one glint onto the light detector.

Although the light source and the light detector may be co-located, in other embodiments, the light source and light detector are spatially separated. Then, a beam splitter may be arranged to receive light from the light source and direct it towards the HOE and to receive light from the HOE and direct it towards the light detector. Alternatively, a first HOE may be configured to reflect light from the light source on a first side of the HOE towards the eye and a second HOE may configured to receive the at least one glint of the light from the eye and focus the light from the received at least one glint onto the light detector on a second side of the HOE, opposite the first side.

The invention claimed is:

1. An optical system for eye tracking, comprising:

a light source, the light source arranged to emit light;

a light detector for detecting light and indicating positional information of the detected light thereby;

a Holographic Optical Element (HOE) arrangement configured to direct light from the light source towards an eye, and to receive at least one glint of the light from the eye and to direct light from the received at least one glint to be in focus at the light detector, wherein the HOE arrangement is configured with an object space numerical aperture of at least 0.2 so that ambient or stray light directed by the HOE arrangement is out of focus at the light detector.

2. The optical system of claim 1, wherein the light detector is further configured to generate an electrical signal based on the detected at least one glint, wherein the optical system further comprises:

a processor configured to determine positional information of the eye using the electrical signal and the positional information of the detected glint indicated thereby.

3. The optical system of claim 2, wherein light detector detects an image, and wherein the processor is configured to determine positional information of the eye based on an identified location of the detected at least one glint in the image.

4. The optical system of claim 1, wherein the numerical aperture is greater than 0.2 and no more than 0.8.

5. The optical system of claim 1, wherein the light source is arranged to emit divergent light, and wherein the HOE arrangement is further configured to converge the light from the light source onto the eye.

6. The optical system of claim 1, wherein the HOE arrangement is further configured to converge the light from the light source onto a center of curvature of a sclera and/or cornea of the eye.

7. The optical system of claim 1, further comprising:

a frame structure configured for a user to wear, wherein the light source, and the light detector and the HOE arrangement are mounted on the frame structure.

8. The optical system of any claim 1, wherein the HOE arrangement comprises a point to point hologram recorded to act as an ellipsoidal mirror and/or to focus received light to two finite focal points.

9. The optical system of claim 1, wherein the HOE arrangement is configured to use each of the received at least one glint to replay a respective hologram, each replayed hologram being focused onto the light detector.

10. The optical system of claim 1, wherein the HOE arrangement is recorded with a plurality of holograms and is configured to use the light from the light source to replay the plurality of holograms, so that each of the plurality of holograms converges at a slightly different angle so as to generate multiple glints from the eye.

11. The optical system of claim 1, wherein the light source comprises multiple distinct light sources, so that the HOE arrangement is configured to direct light from the multiple distinct light sources towards the eye, thereby generating multiple glints from the eye.

12. The optical system of claim 1, wherein the HOE arrangement comprises a single HOE.

13. The optical system of claim 1, wherein the HOE arrangement comprises a plurality of HOEs, each HOE of the plurality of HOEs being recorded with a different hologram.

14. The optical system of claim 13, wherein the HOE arrangement comprises a first HOE configured to reflect light from the light source towards the eye and a second HOE configured to receive the at least one glint of the light from the eye and to focus the light from the received at least one glint onto the light detector.

15. The optical system of claim 13, further comprising a waveguide, and wherein the HOE arrangement comprises:

a first HOE, configured to couple the light from the light source into the waveguide; and a second HOE, configured to couple the incoupled light from the light source out of the waveguide, to reflect the outcoupled light to the eye and to couple the at least one glint of the light from the eye in to the waveguide, wherein the first HOE is further configured to out-couple at least one glint of the light from the waveguide and to focus the light from the received at least one glint onto the light detector.

16. The optical system of claim 1, wherein the light source and the light detector are co-located.

17. The optical system of claim 16, wherein the light source and the light detector are integrated.

18. The optical system of claim 17, wherein the integrated light source and light detector comprises one of: a plurality of light emitting diodes (LEDs) modulated, so as to be used as sensors when not emitting light; and separate light sources and light detectors within a single device.

19. The optical system of claim 1, wherein the light source and light detector are spatially separated.

20. An augmented reality (AR) or virtual reality (VR) system, comprising:

an optical display system, for displaying AR or VR images;

an optical eye tracking system comprising the optical system according to claim 1 and configured to provide an eye measurement indication; and a processor configured to control the optical display system based on the eye measurement indication provided by the optical eye tracking system.

* * * * *